US010057256B1

(12) United States Patent
Talbot (10) Patent No.: US 10,057,256 B1
(45) Date of Patent: Aug. 21, 2018

(54) METHOD AND SYSTEM FOR VISUALLY AUTHENTICATING THE IDENTITY OF A CALLER USING A VIDEO RELAY SERVICE

(71) Applicant: Chris Talbot, Moorpark, CA (US)

(72) Inventor: Chris Talbot, Moorpark, CA (US)

( * ) Notice: Subject to any disclaimer, the term of this patent is extended or adjusted under 35 U.S.C. 154(b) by 0 days.

(21) Appl. No.: 15/667,583

(22) Filed: Aug. 2, 2017

(51) Int. Cl.
| H04L 29/06 | (2006.01) |
| G09B 21/06 | (2006.01) |
| H04W 12/06 | (2009.01) |
| H04W 12/12 | (2009.01) |
| G09B 21/00 | (2006.01) |

(52) U.S. Cl.
CPC ........ H04L 63/0853 (2013.01); G09B 21/009 (2013.01); H04W 12/06 (2013.01); H04W 12/12 (2013.01)

(58) Field of Classification Search
CPC .. H04L 63/0853; G09B 21/009; H04W 12/06; H04W 12/12
See application file for complete search history.

(56) References Cited

U.S. PATENT DOCUMENTS

| 5,382,972 | A  | * | 1/1995 | Kannes  ................... | H04N 5/445 348/14.01 |
| 7,046,779 | B2 | * | 5/2006 | Hesse ................. | H04L 12/1818 348/E7.084 |
| 7,349,955 | B1 |   | 3/2008 | Korb et al. | |
| 8,010,706 | B1 |   | 8/2011 | Rein et al. | |
| 8,528,068 | B1 |   | 9/2013 | Weglein et al. | |
| 8,739,234 | B1 | * | 5/2014 | Cheung ............ | H04N 21/25841 725/29 |
| 9,344,674 | B2 | * | 5/2016 | Talbot ..................... | H04N 7/147 |
| 9,628,620 | B1 |   | 4/2017 | Rae et al. | |
| 2003/0069997 | A1 | * | 4/2003 | Bravin ................ | G06F 17/2765 709/250 |
| 2012/0176466 | A1 | * | 7/2012 | Wrench ................ | G06Q 10/101 348/14.07 |
| 2015/0022616 | A1 |   | 1/2015 | Talbot | |
| 2015/0271444 | A1 | * | 9/2015 | Defazio ................. | H04N 7/141 348/14.07 |
| 2018/0013886 | A1 |   | 1/2018 | Rae et al. | |

* cited by examiner

*Primary Examiner* — Brandon J Miller
(74) *Attorney, Agent, or Firm* — Scheinberg & Associates, PC; John B. Kelly (57) ABSTRACT

A method and system are disclosed for enabling a real-time visual verification that a video relay service (VRS) call originates from a specific pre-authorized and pre-determined inmate at a corrections facility. The method comprises providing a VRS call recorder, a VRS rules gateway, and a VRS video client being used by the inmate to connect to another VRS client being used by a sign language interpreter (SLI). The display seen by the SLI has a picture-in-picture image showing the inmate (from a database of images of inmates stored in the rules gateway) who should be using the VRS client as well as a real-time video image of the inmate actually using the VRS client. If the picture-in-picture image does not match the live video image, then the audio call to the designated phone number may not be placed by the SLI.

22 Claims, 7 Drawing Sheets

METHOD AND SYSTEM FOR VISUALLY AUTHENTICATING THE IDENTITY OF A CALLER USING A VIDEO RELAY SERVICE

TECHNICAL FIELD OF THE INVENTION

The present invention relates to telecommunications services for callers who are deaf, hard-of-hearing, or speech impaired, and in particular to video relay service (VRS).

BACKGROUND OF THE INVENTION

Traditional telephony presents a problem for persons who are who are deaf, hard of hearing, or speech-impaired (D-HOH-SI). Communication by telephone requires each party to a telephone call to be able to hear and/or speak to the other party on the call to communicate. For hearing or speech impaired persons, audio communication is difficult or impossible, making telephone communication difficult or impossible.

Early approaches to facilitating telecommunications for D-HOH-SI persons included text-based telecommunications relay service (TRS). Text-based TRS services allow a D-HOH-SI person to communicate with other people over an existing telecommunications network using devices capable of transmitting and receiving text characters over the telecommunications network. Such devices include the telecommunications device for the deaf (TDD) and the teletypewriter (TTY). Text-based TRS services were well-suited to the bandwidth limitations of subscriber lines of the time. The bandwidth limitations of subscriber lines were also a limiting factor in the widespread use of video telephony.

The availability of affordable, high-speed packet-switched communications has led to the growth in the use of VRS by D-HOH-SI persons. Using VRS equipment, D-HOH-SI persons can place video calls to communicate between themselves and with hearing individuals using sign language (SL). VRS equipment enables D-HOH-SI persons to talk to hearing individuals via a sign language interpreter (SLI), who uses a conventional telephone at the same time to communicate with the party or parties with whom the D-HOH-SI person wants to communicate. The interpretation flow is normally within the same principal language, such as American Sign Language (ASL) to spoken English or spoken Spanish.

VRS calls present a unique set of issues in a corrections environment (e.g., prison, juvenile detention center, etc.). During VRS calls, typically the inmate ("user") will sit in front of a first VRS terminal containing a display and a camera. The SLI will sit in front of a second VRS terminal which will display a real-time or "live" video image of the user. The user may then communicate via SL with the SLI, who may then communicate through standard audio telephony with a non-D-HOH-SI individual(s) having a need and/or desire to communicate with the inmate (family member, attorney, clergyman, friend, etc.). For privileged communications with attorneys or clergymen, recording of the VRS call is not permitted. For other communications, it may be desirable or legally-required to record the VRS call.

Problems may occur, such as inmates attempting to circumvent restrictions on who may place calls, or to whom calls may be placed. It would be advantageous to provide a method and system for preventing unauthorized use of a VRS system for placing calls from a correctional institution.

SUMMARY OF THE INVENTION

Embodiments of the present invention are directed to a method and system for providing a visual indication to an SLI that a VRS call originates from a specific pre-determined inmate at a corrections facility. A small picture-in-picture of the inmate is displayed on the VRS display of the SLI to enable a visual verification that the inmate shown in the real-time (live) video on their display matches the appearance of the pre-stored photo displayed in the picture-in-picture. If the picture-in-picture image and the live video of the user appear to match, the SLI may assume that the specific pre-determined inmate approved for the call is indeed sitting at the VRS terminal within the correctional facility. If the image and video do not appear to match, the SLI may challenge the identity of the user before proceeding with the audio phone call to the pre-determined number. In situations where the VRS user from the correctional facility is "trusted", i.e., is a guard or warden, etc., then the system and method will not require a pre-stored image to be displayed for the SLI, and in some situations instead of an SLI the receiver of the VRS call may not be an SLI but rather some other type of individual (law enforcement, attorney, clergy, family, etc.).

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION OF PREFERRED EMBODIMENTS

Embodiments of the present invention are directed to a method and system for enabling a real-time visual verification that a VRS call originates from a specific pre-determined inmate at a corrections facility. In a VRS, an inmate (using VRS client #1) communicates visually with an SLI (using VRS client #2). A small pre-stored picture-in-picture of the specific pre-determined inmate is displayed by VRS client #2 to enable the SLI to verify that the inmate shown in the real-time (live) video on their display matches the appearance of the pre-stored photo displayed in the picture-in-picture. If the image and video appear to match, the SLI may assume that the specific pre-determined inmate approved for the call is indeed sitting at the VRS terminal within the correctional facility. If the image and video do not appear to match, the SLI may challenge the identity of the user before proceeding with the phone call to the pre-determined number. In situations where the VRS user from the correctional facility is "trusted", e.g., is a guard or warden, etc., then the system and method will not require a pre-stored image to be displayed for the SLI, and in some situations instead of an SLI the receiver of the VRS call (using VRS client #2) may not be an SLI but rather some other type of individual (law enforcement, attorney, clergyman, family, etc.). Depending on the identity of the receiver of the call from the inmate, who will be communicating verbally with the SLI, the VRS call may be recorded (e.g., a call to family, spouse, ex-spouse, friends, etc.) or may be legally-prevented from being recorded (e.g., an inmate-attorney confidential call, or inmate-clergyman call).

VRS System Enabling Real-Time Visual Verification of a User's Identity

Figure 1:
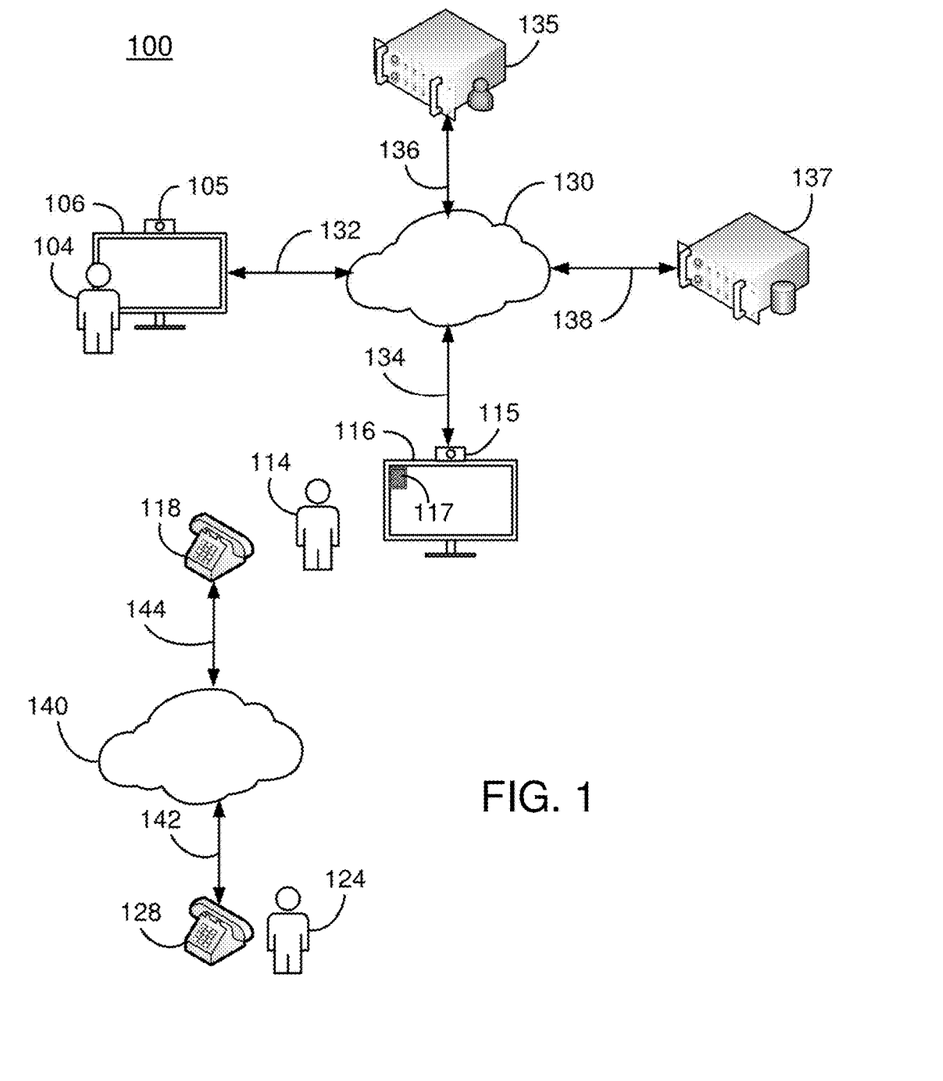
FIG. 1 is a schematic diagram showing a VRS system in accordance with embodiments of the present invention.

FIG. 1 is a schematic diagram 100 showing a VRS system enabling a real-time visual verification of the identity of a user to an SLI in accordance with embodiments of the present invention. User 104 is located in proximity to VRS client 105 so that user 104 can interact with VRS client 105. User 104 may be a person who is deaf (D), hard-of-hearing (HOH), and/or speech-impaired (SI), or any other person who communicates via SL. User 104 may be an inmate in a corrections environment (e.g., prison, juvenile detention center, etc.) who is a specific individual having a pre-determined authorization to place a VRS call to a specific phone number. User 104 interacts with VRS client 105 by viewing video on display 106. Display 106 is any device suitable for displaying to user 104 a video signal from SLI 114 (at VRS client 115), with sufficient video quality and frame rate so that a person fluent in SL can comprehend the SLI. VRS client 105 includes a video capture device suitable for capturing a video signal of user 104 within the field-of-view of the camera at sufficient quality and frame rate to support SL communication with SLI 114. VRS client 105 also includes hardware and/or software to, substantially in real-time, convert the captured video signal into a data stream suitable for transmission over packet-switched network 130, such as an internet protocol (IP) network, over network link 132. VRS client 105 also includes hardware/software for adding a picture-in-picture 117 from a database (such as a Rules Gateway 135) to the video stream, for the SLI to observe on display 116. VRS client 106 also includes hardware and/or software to transmit the data stream over packet-switched network 130 at sufficient network speed so that a remote VRS client, such as VRS client 115, can display the data stream as video on a display device, such as display 116, in sufficient quality and frame rate for SLI 114 to comprehend SL from user 104 in the displayed video. VRS client 105 can also include hardware and/or software to, substantially in real-time, receive a data stream from a remote VRS terminal, such as VRS terminal 115, from packet-switched network 130 over network link 132, convert the data stream into a suitable video signal, and output the video signal to display 106. In a corrections environment, VRS client 105 may be located at the facility where user 104 is incarcerated to that user 104 can communicate with persons who are not located at the facility, such as family, an attorney, or clergy. VRS client 105 may apply video watermarks to the VRS call. The video watermarks can include a visual indication that informs one or more parties to the call that the call is being recorded. The video watermarks can include a time and/or date indication. The video watermarks can include an identification associated with one or more of the parties to the call, such as an inmate identification number and/or an identification of the corrections facility.

Signaling over packet-switched network 130 is preferably implemented using session initiation protocol (SIP). Alternatively, signaling over packet-switched network 130 is implemented using the H.323 standard from the International Telecommunication Union Telecommunication Standardization Sector (ITU-T). Those skilled in the art will recognize that any signaling means suitable for transmitting and receiving video substantially in real-time is within the scope of the present invention.

In a preferred embodiment, display 106 can be a high definition flat panel display with digital inputs, such as digital visual interface (DVI) or high-definition multimedia interface (HDMI) connectors. VRS client 105 can include digital outputs, such as digital visual interface (DVI) or high-definition multimedia interface (HDMI) connectors. VRS client 105 can connect to display 106 via compatible cabling, as is known in the art. User 104 can operate VRS client 105 by a remote input device, such as an infrared (IR), radio frequency (RF), or Bluetooth® handheld remote. VRS client 105 can include a digital video camera assembly mounted to the front-facing (i.e., user-facing) panel. The digital video camera can include an active pixel sensor, such as a complementary metal oxide semiconductor (CMOS) sensor or a charge-coupled device (CCD) sensor. VRS client 105 can include a network interface for establishing network link 132 with packet-switched network 130, such as Ethernet support and a wired an RJ-45 connector and/or IEEE 802.11 "Wi-Fi" connectivity. VRS client 105 can include one or more universal serial bus (USB) connectors for connecting USB devices, such as flash accessory (a high light intensity visual indicator) that can be used to alert a D-HOH user that an incoming call is waiting to be answered. VRS client 105 can also include an interface for flash storage media, such as a Secure Digital (SD) non-volatile memory card. VRS client 105 can include a clamp that can be used to fasten VRS terminal 105 to display 106 in so that the camera faces user 104 as user 104 views display 106. The clamp can be opened to be alternatively used as a desktop stand.

A single device having an integrated VRS client 105, 115 and displays 106, 116 is within the scope of the present invention. Moreover, VRS client 105, 115 can be implemented as software executing on a general-purpose computer meeting the hardware requirements for video telephony over IP networks and programmed with software to perform the functions of VRS client 105, 115 and displays 106, 116 as disclosed herein is within the scope of the present invention. Such general-purpose computers include desktop personal computers (PC), laptop computers, tablet computers, smartphones, etc. Portable devices such as smartphones and tablets having front-facing cameras and IP data connectivity can be particularly useful in helping D-HOH-SI persons communicate with hearing persons via VRS service due to the mobility of the portable devices.

VRS client 115 can be operated by the VRS service provider. SLI 114 is located in order to be able to interact with VRS client 115. While only one SLI 114 and one VRS client 115 is shown, one skilled in the art will understand that a VRS service provider may comprise a large enterprise including hundreds of SLIs (or more) and sufficient service side equipment to provide around the clock VRS service to a large number of users.

SLI 114 is preferably a person who can communicate via SL and is proficient at SL translation. Display 116 can be any device suitable for displaying to SLI 114 the video signal of a user 104 in sufficient quality and frame rate so that SLI 114 can comprehend the SL from user 104. VRS client 115 can include a video capture device suitable for capturing a video signal of SLI 114 within the field-of-view of the camera at sufficient quality and frame rate to support SL communication with user 104. VRS client 115 can also include hardware and/or software to, substantially in real-time, convert the captured video signal into a data stream suitable for transmission over packet-switched network 130, such as an internet protocol (IP) network, over network link 134. VRS client 105 can also include hardware and/or software to transmit the data stream over packet-switched network 130 at sufficient network speed so that VRS client 105 can display the data stream as video on display device 106 in sufficient quality for user 104 to comprehend SL in the displayed video. VRS client 115 can also include hardware and/or software to, substantially in real-time, receive a data stream from VRS client 105 from packet-switched network 130 over network link 134, convert the data stream into a suitable video signal, and output the video signal to display 116.

Service side equipment can also include traditional public switched telephone network equipment (PSTN), shown in FIG. 1 as telephone 118. While a simple telephone 118 is shown, one skilled in the art would understand that any type of equipment for making and receiving PSTN calls is within the scope of the present invention, including complex enterprise-level telephone systems, computers adapted for placing telephone calls, and cellular telephones. Telephone 118 is connected to the public switched telephone network (PSTN) 140 by network link 144 and is capable of making and receiving traditional circuit switched telephone calls to PSTN telephone numbers.

Hearing person 124 can be a person who has the ability to communicate over PSTN 140 using at least one spoken language via telephone 128. Telephone 128 is connected to the public switched telephone network (PSTN) 140 by network link 142 and is capable of making and receiving traditional circuit switched telephone calls to PSTN telephone numbers. While a simple telephone 128 is shown, one skilled in the art would understand that any type of equipment for making and receiving PSTN calls is within the scope of the present invention, including complex enterprise-level telephone systems, computers adapted for placing telephone calls, and cellular telephones.

Rules gateway 135 is connected to packet-switched network 130 over network link 136. Rules gateway 135 may be located in the corrections environment where user 104 is located. Rules gateway 135 may be included in service side equipment located at a facility operated by the VRS service provider. Rules gateway 135 can store pre-acquired photos (for future use in picture-in-picture) of users wishing to be authorized for use of the VRS system at the correctional facility. Rules gateway 135 can be implemented as a software-as-a-service (SaaS) web service hosted in cloud networking system and accessible by way of packet-switched network 130. Rules gateway 135 can be used to determine whether a VRS call in a corrections environment is to be recorded. Rules gateway 135 can be used to modify VRS call properties for recording. The operation of rules gateway 135 is explained in further detail with respect to FIGS. 5 and 6.

Recorder 137 is a device that is capable of recording a VRS call, including audio, video, and any watermarks applied to the call. Recorder 137 can be connected to packet-switched network 130 over network link 138. Recorder 137 may be located in the corrections environment where user 104 is located. Recorder 137 may be included in service side equipment located at a facility operated by the VRS service provider. Recorder 137 can be implemented as a software-as-a-service (SaaS) web service hosted in cloud networking system and accessible by way of packet-switched network 130. Recorder 137 can be programmed to automatically record a VRS call based on call properties associated with the VRS call. The call properties can be modified by the VRS client 105 in response to an instruction from rules gateway 135.

Rules gateway 135, recorder 137, VRS client 105, and VRS client 115 can be implemented as separate and distinct systems that operate independent of location and communicate with each other by way of the Internet. Alternatively, one or more of rules gateway 135, recorder 137, VRS client 105, and VRS client 115 can be combined to suit a particular application. For example, VRS client 105, rules gateway 135, and recorder 137 can be integrated into one device for installation at a corrections facility that maintains its own recordings on-site. More than one device can also be provided for redundancy. For example, a recorder can be installed at a corrections facility and a recorder can be installed at the service provider, each recorder separately recording the VRS call in case one recorder fails.

User 104 initiates a VRS video call to SLI 114. SLI 114 then uses telephone 118 to call hearing person 124 on behalf of user 104. The call to hearing person 124 may be placed automatically by service side equipment. SLI 114 and user 104 communicate using SL via VRS client 105 and VRS client 115. SLI 114 and hearing person 124 communicate using spoken language via telephone 118 and telephone 128. In this way, SLI 114 acts as an intermediary between user 104 and hearing person 124, interpreting the communication between user 104 and hearing person 124. Prior to performing this intermediary function, SLI 114 initially performs a visual verification that the user at VRS client 105 is indeed the specific pre-determined individual whose photo is shown in the picture-in-picture display on VRS client 115.

VRS Displays for Recorded and Non-Recorded Calls

Figure 2:
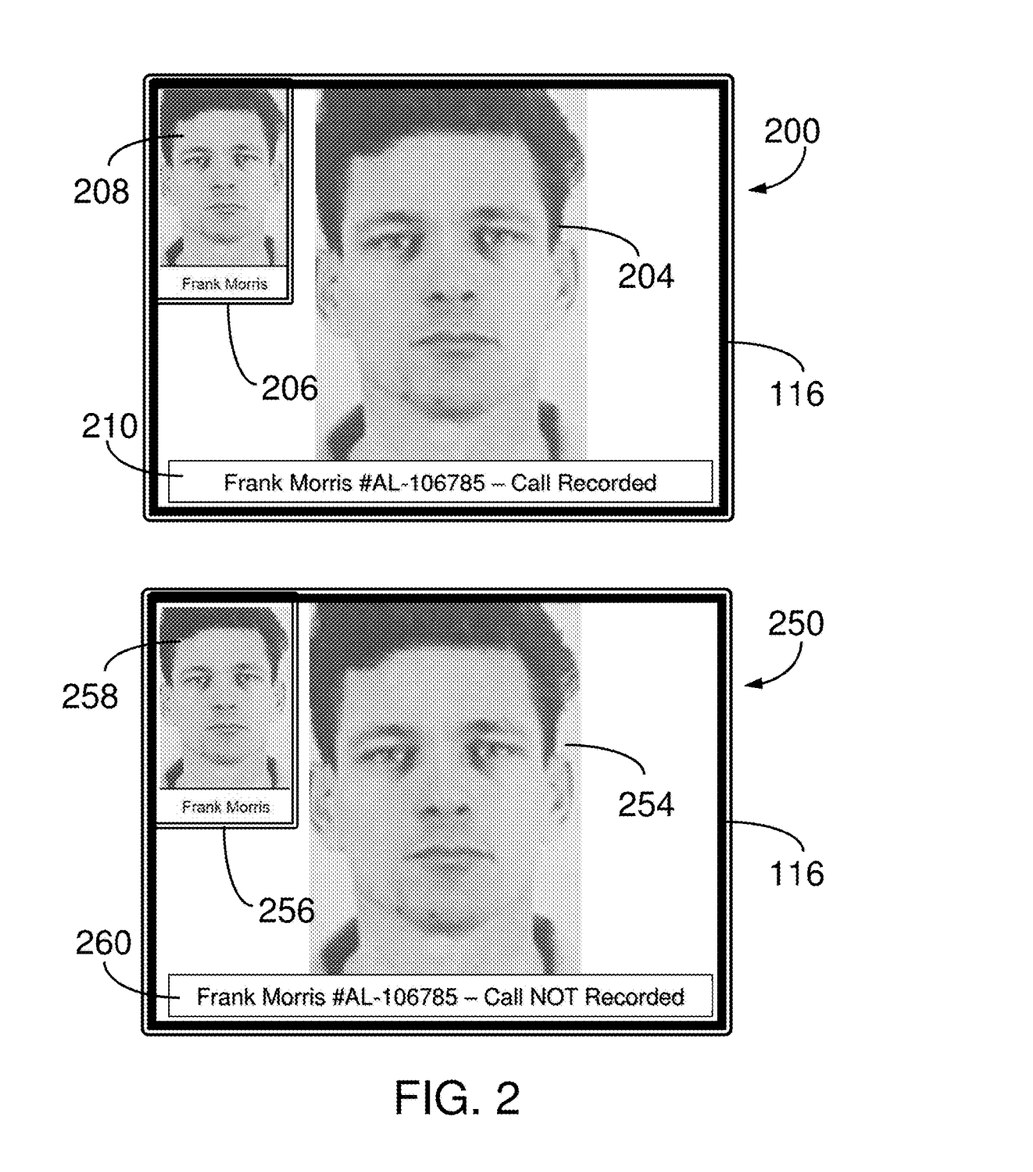
FIG. 2 shows two screen displays for examples with call recording and without call recording.

FIG. 2 shows two screen displays for examples with call recording 200 and without call recording 250. Displays 116 may correspond to the display screen of VRS client 115, being viewed by SLI 114. Picture-in-pictures 206 and 256 show images 208 and 258, respectively, which were taken earlier and stored in the rules gateway 135, as described in FIGS. 1 and 5. In examples 200 and 250, both images 208 and 258 show the same inmate "Frank Morris #AL-106785" as indicated by the windows 210 and 260 at the bottoms of examples 200 and 250. Real-time (live) video images 204 and 254 of authorized user "Frank Morris #AL-106785" are displayed to the SLI for comparison with picture-in-pictures 206 and 256, respectively. Example 200 may correspond to communication between user 104 and various family members, spouse, ex-spouse, fiancée, friends, etc.—these types of communications may typically be recorded both for possible future legal use, as well as a deterrent to illegal communications outside the correctional facility. Example 250 may correspond to privileged communication between the user and his attorney or clergyman—these types of communication may typically not be recorded for confidentiality reasons. Also displayed are text information 210 and 260 about the user, as well as an indication of whether the call is being recorded (example 200) or not-recorded (example 250).

VRS Displays for Calls with Visual Matching and Non-Matching

Figure 3:
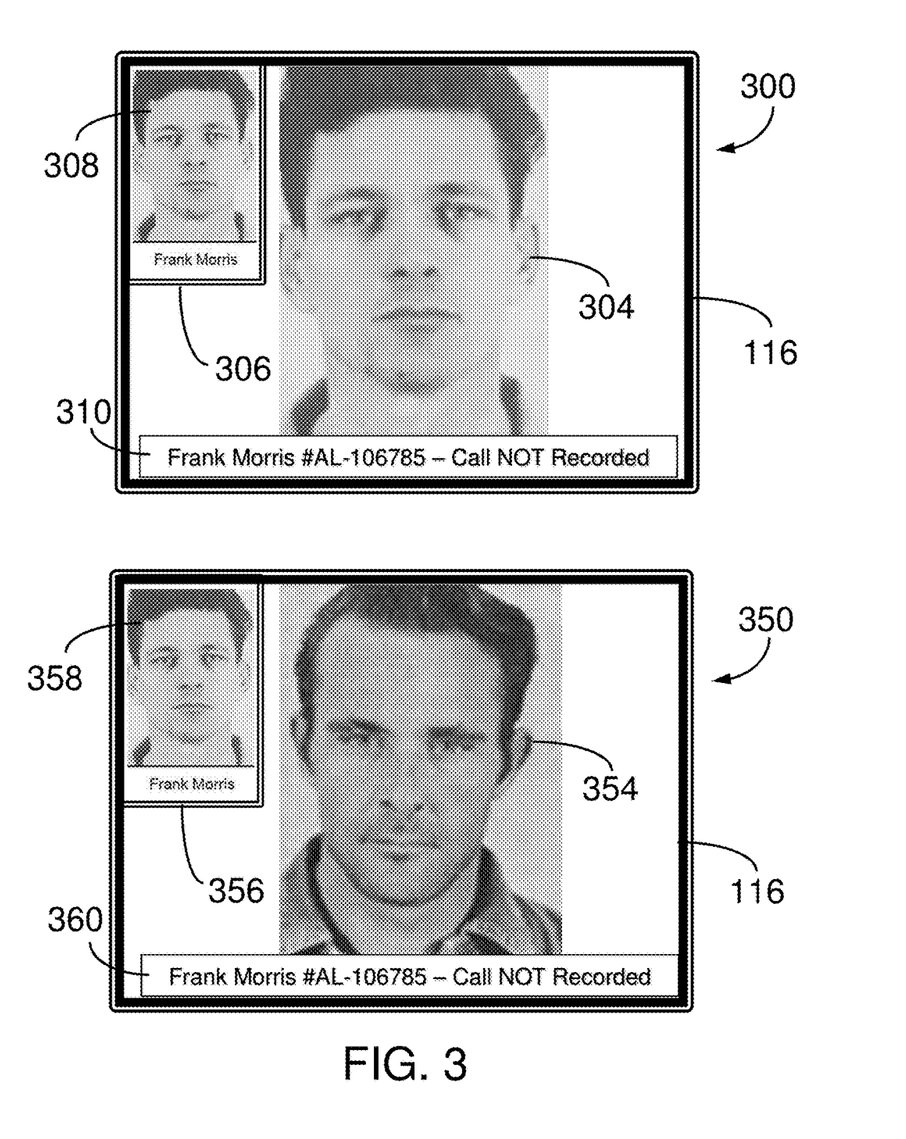
FIG. 3 shows two screen displays for examples where the picture-in-picture matches the video, and where the picture-in-picture does not match the video.

FIG. 3 shows two screen displays for examples where the picture-in-picture matches the video 300, and where the picture-in-picture does not match the video 350. Picture-in-pictures 306 and 356 show images 308 and 358, respectively, which were taken earlier and stored in the rules gateway 135, as described in FIGS. 1 and 5—both images 308 and 358 show inmate "Frank Morris #AL-106785" as indicated by the windows 310 and 360 at the bottoms of examples 300 and 350. Real-time (live) video image 304 shows the specific pre-determined inmate ("Frank Morris #AL-106785") who is supposed to be using the VRS system to communicate with individual(s) outside the correctional facility—thus video image 304 looks close enough to pre-stored image 308 that the SLI 114 can verify a match. Conversely, video image 354 looks different enough from pre-stored image 358 that the SLI may question whether the valid specific pre-determined user is still seated at VRS client 105. Flowchart 600 in FIGS. 6A and 6B describes a full decision process for responding to this non-matching situation, prior to placing the audio phone call to the previously-designated receiver of the call from the valid user. Both examples 300 and 350 may correspond to privileged communication between the user and an attorney or clergyman—thus windows 310 and 360 show "Call NOT Recorded".

VRS Displays for Calls with Untrusted and Trusted Users

Figure 4:
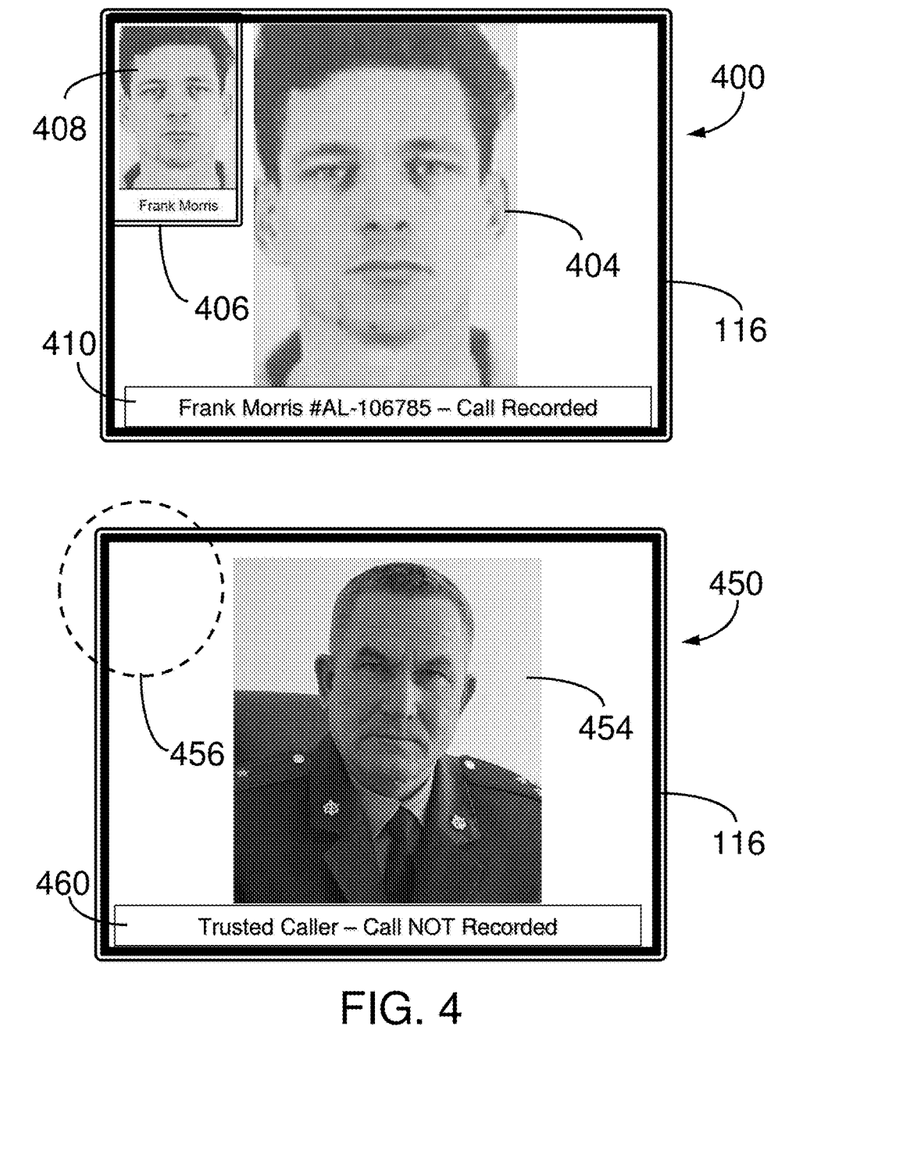
FIG. 4 shows two screen displays for examples of an untrusted user and a trusted user.

FIG. 4 shows two screen displays for examples for an untrusted user 400 and a trusted user 450.

Example 400 shows an untrusted user "Frank Morris #AL-106785" in real-time (live) video image 404 and also in the pre-stored image 408 in picture-in-picture 406. Window 410 displays the user name and also that the call is being recorded, since in this example the call is not to an attorney or clergyman. SLI 114 may verify visually that video image 404 is a close match to image 408, and thus that the correct user is seated at VRS client 105 and the (previously-authorized) call may proceed (while being recorded).

Example 450 shows a trusted user (in this example, the warden) in real-time (live) video image 454. Since the user is trusted, the system and method of the invention do not place a picture-in-picture at location 456 on display 116. Window 460 does not necessarily provide any specific information about the trusted user, however an indication that "Call NOT Recorded" may be provided in some embodiments.

Two Processes of Embodiments

Figure 5:
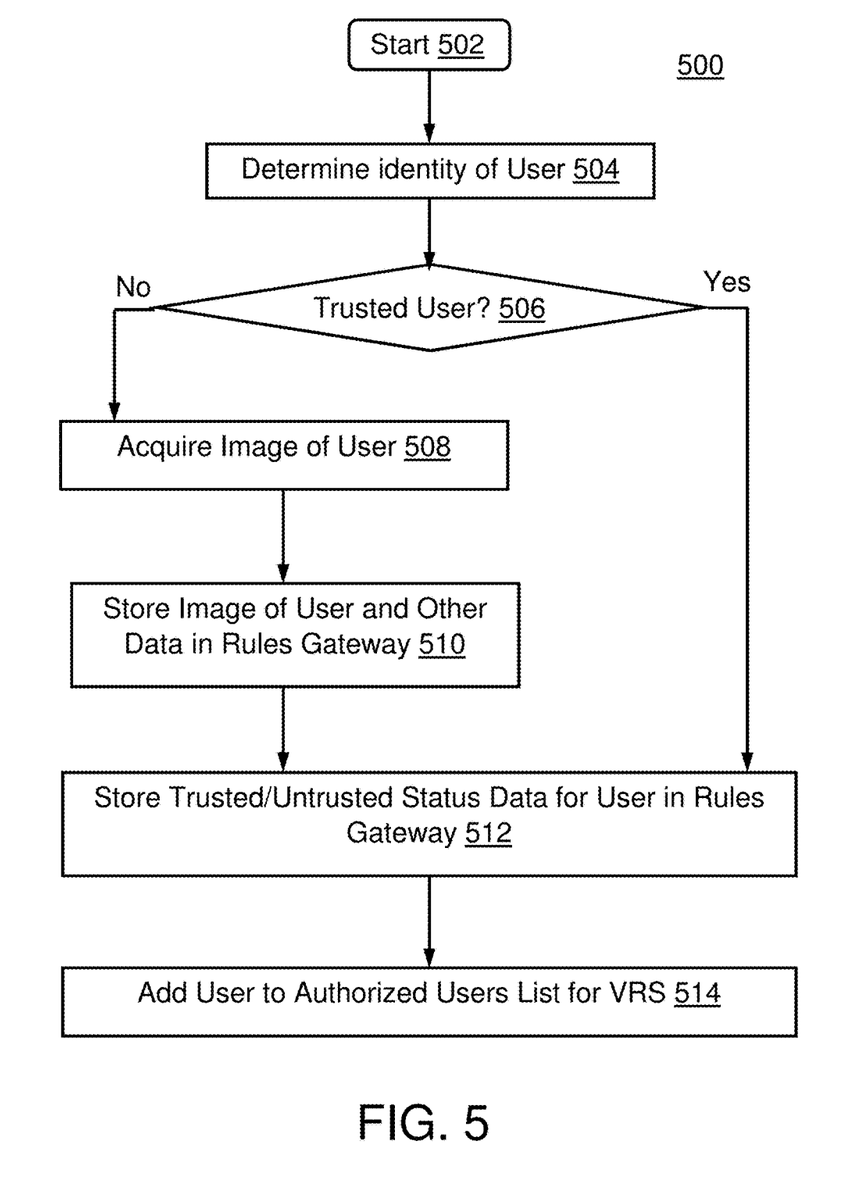
FIG. 5 shows a flowchart for a method of storage of data in a rules gateway for both untrusted and trusted users.

Embodiments comprise two processes:
1) [FIG. 5] A first, off-line, process of acquiring images of all potential users of the VRS system (i.e., inmates in the D-HOH-SI population and capable of using SL). These images may then be verified and stored in the rules gateway 135 or other type of image storage device configured to supply these images to the VRS clients when needed for the picture-in-picture on VRS clients such as VRS client 115.
2) [FIGS. 6A and 6B] A second, real-time, process of displaying the stored user images from the first process on VRS client 115 for viewing by an SLI 114 to determine whether the specific pre-determined user is seated at VRS client 105 as required for authorized use of the VRS system.

Method for Acquisition and Pre-Storage of Images for Use in the Picture-in-Picture Pre-storage of images begins at block 502 in the flowchart 500 of FIG. 5, which may represent a potential user appearing at a photographic station within a correctional facility, possibly with documentation to verify their identity in block 504. If the potential user is "trusted" as determined in block 506, i.e., they are a correctional officer, warden, etc., then no image need be acquired, and block 512 is entered where other data may be entered (e.g., a "trusted" status). If the potential user is "untrusted" as determined in block 506, i.e., they are an inmate, then block 508 is entered and an image of the inmate is taken and then stored in the rules gateway 135 in block 510. Other image storage locations also fall within the scope of the invention. In block 512, miscellaneous information, such as the user status ("untrusted" or "trusted") are also stored in the rules gateway 135. Finally, in block 514, the user's name and other identifying information (e.g., inmate number) are added to an "Authorized User List for VRS".

Method for Real-Time Visual Verification of the User's Identity

Figure 6A:
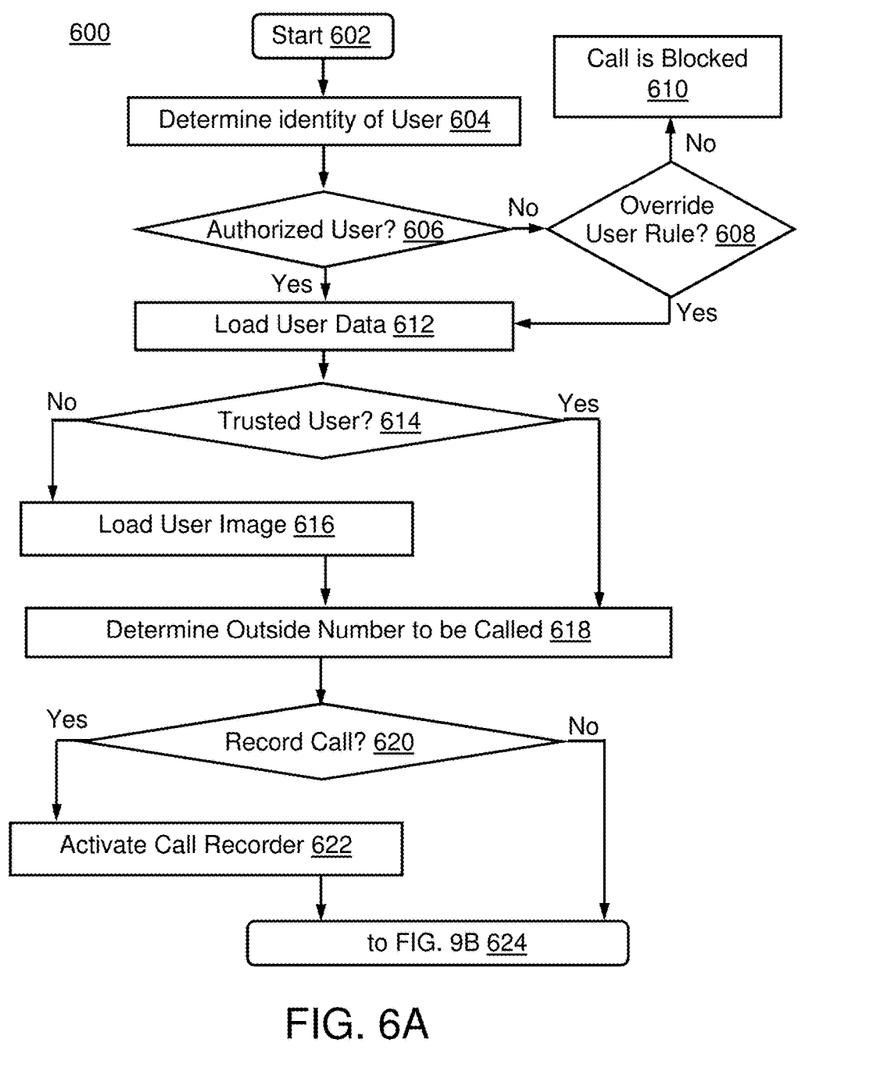
FIGS. 6A and 6B show a flowchart for a method for enabling a real-time visual verification of the identity of a user in a VRS call according to embodiments of the present invention.
Figure 6B:
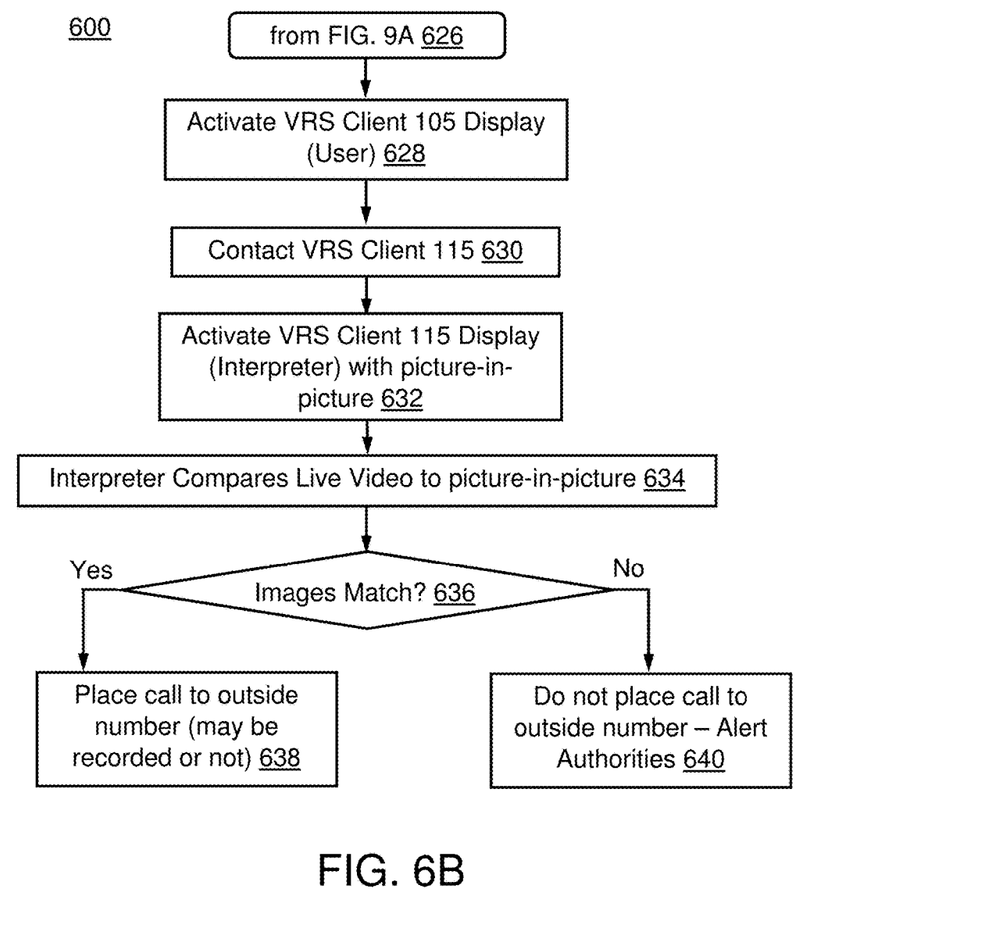

FIGS. 6A and 6B show a flowchart 600 for a method for enabling a real-time visual verification of the identity of a user in a VRS call according to embodiments. The method begins at block 602 in FIG. 6A, which may represent a user applying to use the VRS system to call a family member, spouse, ex-spouse, friend, attorney, clergyman, etc. The identity of the user is determined in block 604, where the user name is checked against the Authorized User List for VRS (which was previously determined in block 514 of FIG. 5) in block 606. If the user is not on the list, block 608 is entered wherein a designated authority within the correctional institution may authorize an "override" of the user rule, which would normally prevent an unauthorized user from accessing the VRS system—in this case, block 612 is entered from block 608. Such an override might occur in special cases of a family or legal emergency as might be determined by the circumstances at the time. If circumstances do not warrant an override to the user rule, block 610 would be entered and the user would be blocked from access to the VRS system.

In cases where the user's identification appears on the Authorized User List, block 612 would be entered out of block 606 and the user's data would be downloaded from the rules gateway 135 or other location used to store user data. Based on the downloaded user data, the status of the user may now be determined in block 614: is the user untrusted or trusted? If the user is untrusted, block 616 is entered and a pre-stored image of the user (from block 508 in FIG. 5) is downloaded from the rules gateway 135 or other image storage device. The user data includes a list of phone numbers which the user has already been pre-authorized to call. These numbers may typically include family members, spouses, ex-spouses, friends, attorneys, clergymen, etc. In general, each of these individuals may be required or allowed to give permission, or to deny permission, for the user to call them, thus even if a user is authorized to use the VRS system, all phone calls placed by the user (actually, calls placed on an audio phone by the SLI in block 638) may only be placed to pre-authorized numbers from this list.

Depending on the phone number, and the type of phone number (i.e., family or attorney), the user information in the database in the rules gateway 135 will determine whether the call can or should be recorded. Typically, calls to family, spouses, ex-spouses, and friends may be recorded, while calls to attorneys and clergymen may legally not be allowed to be recorded—block 620 makes this decision. If the phone number indicates the call should and/or is allowed to be recorded, then block 622 is entered where the recording device, such as recorder 137 in FIG. 1, is activated. The portion of flowchart 600 in FIG. 6A ends at block 624, which connects to block 626 in FIG. 6B.

Once the status of the user has been verified as authorized, in block 628 VRS client 105 (the user's client) is activated. Next VRS client 115 (the SLI's client) is contacted in block 630 and then activated in block 632. Once VRS client 115 is online, the picture-in-picture and the real-time (live) video images should be displayed as illustrated in FIGS. 2-4. At this point, the SLI can compare the video image to the picture-in-picture in block 634 and then make a decision if these images match in block 636. If the SLI believes there is a match, block 638 is entered and the audio call from phone 118 to phone 128 is placed, using the previously determined phone number from the database in the rules gateway 135. If the SLI does not believe there is a match, i.e., possibly the specific pre-determined user has traded places with another (unauthorized) inmate, then block 640 is entered and the proper authorities are notified of the possible problem.

Subsequent actions on the part of the authorities are possible within the scope of embodiments. The real-time (live) video image may be relayed along with the picture-in-picture showing the specified pre-determined user to another VRS client for review by the proper authorities. In some cases, it is possible that the SLI erred in concluding that the video image did not match the picture-in-picture and the user is proper and should be allowed to place the call. In other cases, it could be possible that a rule violation, such as a last-minute inmate swap, has occurred and the call should remain blocked and possible disciplinary actions towards both the specific pre-defined user and the "substitute" inmate should be taken.

The following are additional enumerated embodiments according to the present disclosure.

A first embodiment, which is a method for verifying that a call using a video relay service (VRS) system originates from a first user at a corrections facility, the method comprises providing a user verification system, including a first VRS client at the corrections facility; a second VRS client for use by an SLI; a VRS rules gateway, connected to the first and second VRS clients; a first audio phone for use by the SLI; loading an image of the first user from the VRS rules gateway; activating the first VRS client to contact the second VRS client; and displaying on the second VRS client a real-time (live) video image from the first VRS client and a picture-in-picture of the image of the first user.

A second embodiment, which includes the method of the first embodiment, further comprising: determining a phone number to be called by the first user; and comparing the video image to the picture-in-picture, wherein if the video image matches the picture-in-picture, initiating a call using the first audio phone to a second audio phone corresponding to the phone number to be called by the first user.

A third embodiment, which includes the method of the first embodiment, further comprising acquiring images of a multiplicity of users of the user verification system; and storing the images in the VRS rules gateway.

A fourth embodiment, which includes the method of the first embodiment, further comprising determining if the first user is authorized to use the VRS system, wherein if the first user is not authorized to use the VRS system, blocking the first user from using the VRS system.

A fifth embodiment, which includes the method of the second embodiment, further comprising determining if the user is a trusted user, wherein if the user is a trusted user skipping the loading an image of the first user from the VRS rules gateway; the displaying the picture-in-picture; and the comparing the video image to the picture-in-picture.

A sixth embodiment, which includes the method of the first embodiment, further comprising determining if the call should be recorded, wherein if the call should be recorded, activating a call recorder.

A seventh embodiment, which includes the method of the second embodiment, wherein if the video image does not match the picture-in-picture, alerting authorities within the corrections facility.

An eighth embodiment, which includes the method of the first embodiment, wherein the multiplicity of users of the user verification system includes the first user.

A ninth embodiment, which includes the method of the first embodiment, wherein the multiplicity of users of the user verification system does not include the first user.

A tenth embodiment, which includes the method of the first embodiment, further comprising displaying a window on the second VRS client showing user data.

An eleventh embodiment, which is a system for verifying that a call using a VRS system originates from a first user at a corrections facility, comprising a first VRS client at the corrections facility; a second VRS client for use by an SLI; a VRS rules gateway, connected to the first and second VRS clients; and a first audio phone for use by the SLI; wherein the second VRS client is configured to display a picture-in-picture of the first user along with a real-time (live) video image of a second user at the first VRS client, wherein the second user may be the same as the first user.

A twelfth embodiment, which includes the system of the eleventh embodiment, wherein the SLI may compare the video image to the picture-in-picture.

A thirteenth embodiment, which includes the system of the twelfth embodiment, wherein if the if the video image matches the picture-in-picture, initiating a call using the first audio phone to a second audio phone.

A fourteenth embodiment, which includes the system of the thirteenth embodiment, wherein the phone number of the second audio phone is comprised in a list of user data for the first user.

A fifteenth embodiment, which includes the system of the eleventh embodiment, further comprising an authorized users list.

A sixteenth embodiment, which includes the system of the fifteenth embodiment, wherein if the user identity is not on the authorized users list, the first user is blocked from using the VRS system.

A seventeenth embodiment, which includes the system of eleventh embodiment, further comprising a call recording device.

An eighteenth embodiment, which includes the system of the seventeenth embodiment, wherein the phone number to be called determines whether the call should be recorded.

A nineteenth embodiment, which includes the system of eighteenth embodiment, wherein if the call should be recorded, activating the recording device to record the call.

While the foregoing describes a preferred embodiment of the present invention, one skilled in the art will appreciate that various changes, substitutions and alterations can be made without departing from the scope of the invention. For example, a single device having an integrated VRS client 105, 115 and display 106, 116 is within the scope of the present invention. Moreover, VRS clients 105 and 115 implemented as software executing on general purpose computers meeting the hardware requirements for video telephony over IP networks and programmed with software to perform the functions of VRS clients 105, 115, and displays 106, 116, as disclosed herein is within the scope of the present invention. Such general-purpose computers include desktop personal computers (PCs), laptop computers, tablet computers, smartphones, etc. Portable devices such as smartphones and tablets having front-facing cameras and IP data connectivity can be particularly useful in helping D-HOH-SI persons communicate with hearing persons via VRS service due to the mobility of the portable devices.

Although the present invention and its advantages have been described in detail, it should be understood that various changes, substitutions and alterations can be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A method for verifying the identity of a user of a video relay service (VRS) system at a corrections facility, the method comprising:
   providing a user verification system, including:
      a first VRS client at the corrections facility;
      a second VRS client for use by a sign language interpreter;
      a VRS rules gateway, connected to the first VRS client and the second VRS client;
   loading an image of a first user from the VRS rules gateway;
   initiating a VRS call between the first VRS client and the second VRS client; and
   displaying on the second VRS client a real-time video image from the first VRS client and a picture-in-picture of the image of the first user.

2. The method of claim 1, further comprising:
   comparing the video image to the picture-in-picture, wherein if the video image includes an image of a user that matches the picture-in-picture, initiating a call between the sign language interpreter to a second audio phone corresponding to the phone number to be called by the first user.

3. The method of claim 2, further comprising determining if the user is a trusted user, wherein if the user is a trusted user skipping the loading an image of the first user from the VRS rules gateway; the displaying the picture-in-picture; and the comparing the video image to the picture-in-picture.

4. The method of claim 2, wherein if the video image does not match the picture-in-picture, alerting authorities within the corrections facility.

5. The method of claim 1, further comprising acquiring images of a multiplicity of users of the user verification system; and storing the images in the VRS rules gateway.

6. The method of claim 1, further comprising determining if the first user is authorized to use the VRS system, wherein if the first user is not authorized to use the VRS system, blocking the first user from using the VRS system.

7. The method of claim 1, further comprising determining if the call should be recorded, wherein if the call should be recorded, activating a call recorder.

8. The method of claim 1, wherein the multiplicity of users of the user verification system includes the first user.

9. The method of claim 1, wherein the multiplicity of users of the user verification system does not include the first user.

10. The method of claim 1, further comprising displaying a window on the second VRS client showing user data.

11. A system for verifying that a call using a VRS system originates from a first user at a corrections facility, comprising:
    a first VRS client at the corrections facility;
    a second VRS client for use by a sign language interpreter;
    a VRS rules gateway, connected to the first and second VRS clients; and
    a first audio phone for use by the sign language interpreter;
    wherein the second VRS client is configured to display a picture-in-picture image of the first user along with a real-time video image of a second user at the first VRS client, wherein the second user may be the same as the first user.

12. The system of claim 11, wherein the sign language interpreter may compare the video image to the picture-in-picture.

13. The system of claim 12, wherein if the if the video image matches the picture-in-picture, initiating a call using the first audio phone to a second audio phone.

14. The system of claim 13, wherein the phone number of the second audio phone is comprised in a list of user data for the first user.

15. The system of claim 11, further comprising an authorized users list.

16. The system of claim 15, wherein if the user identity is not on the authorized users list, the first user is blocked from using the VRS system.

17. A method for verifying the identity of an inmate at a corrections facility during a video relay service (VRS) call, the method comprising:
    initiating a VRS call between an inmate and a called party;
    prior to contacting the called party, comparing a stored image of the inmate with a live image of the inmate shown during the VRS call;
    in response to determining that the stored image of the inmate matches the live image of the inmate shown during the VRS call, contacting the called party; and
    in response to determining that the stored image of the inmate does not match the image of the inmate shown during the VRS call, terminating the call.

18. The method of claim 17, wherein comparing the stored image of the inmate with the live image of the inmate shown during the VRS call further comprises:
    displaying the stored image as a picture-in-picture image overlaid on at least a portion of the live image of the inmate displayed during the VRS call;

comparing, by a trusted third party, the picture-in-picture image with the live image of the inmate to determine whether the stored image of the inmate matches the live image of the inmate shown during the VRS call.

19. The method of claim 18, in which the trusted third party is a sign language interpreter used during the VRS call.

20. The method of claim 18, in which the trusted third party is a guard or a warden.

21. The method of claim 17, wherein comparing the stored image of the inmate with the live image of the inmate shown during the VRS call is performed by automated facial recognition software.

22. The method of claim 17, wherein comparing the stored image of the inmate with the live image of the inmate shown during the VRS call is performed substantially continuously for the duration of the VRS call.

\* \* \* \* \*